(12) United States Patent
Kramer

(10) Patent No.: US 6,176,163 B1
(45) Date of Patent: Jan. 23, 2001

(54) PIPE END MACHINING UNIT

(75) Inventor: Herbert Kramer, Singen (DE)

(73) Assignee: Georg Fischer Rohrverbindungstechnik GmbH, Singen (DE)

(*) Notice: Under 35 U.S.C. 154(b), the term of this patent shall be extended for 0 days.

(21) Appl. No.: 09/290,425

(22) Filed: Apr. 13, 1999

(30) Foreign Application Priority Data

Apr. 14, 1998 (DE) .............................. 198 16 179

(51) Int. Cl.⁷ ........................................... B23B 5/16
(52) U.S. Cl. ........................... 82/113; 82/128; 82/158
(58) Field of Search ..................... 82/113, 70.1, 70.2, 82/83, 128, 158, 905

(56) References Cited

U.S. PATENT DOCUMENTS

| | | |
|---|---|---|
| 3,330,366 | 7/1967 | Lowry et al. . |
| 3,379,080 * | 4/1968 | Massa ........................... 82/61 |
| 4,186,630 | 2/1980 | Lindhag . |
| 4,202,650 | 5/1980 | Erickson . |
| 4,422,356 | 12/1983 | Pertle . |
| 4,437,366 | 3/1984 | Lathe . |
| 4,452,110 | 6/1984 | Emmerson . |
| 4,656,898 * | 4/1987 | Hunt et al. ........................ 82/128 |
| 4,677,884 * | 7/1987 | Kwech et al. ..................... 82/113 |
| 4,739,682 | 4/1988 | Birkestrand . |
| 4,758,121 | 7/1988 | Kwech . |
| 4,939,964 * | 7/1990 | Ricci ................................ 82/113 |
| 5,361,659 | 11/1994 | Hanson . |
| 5,609,081 | 3/1997 | Lin . |

FOREIGN PATENT DOCUMENTS

| | | |
|---|---|---|
| 2541414 | 7/1976 | (DE) . |
| 3238102 | 7/1983 | (DE) . |
| 8526364 | 2/1986 | (DE) . |
| 19613500 | 11/1996 | (DE) . |
| 19726498 | 2/1998 | (DE) . |
| 0033588 | 8/1981 | (EP) . |

* cited by examiner

*Primary Examiner*—Henry W. H. Tsai
(74) *Attorney, Agent, or Firm*—Bachman & LaPointe, P.C.

(57) ABSTRACT

A pipe end machining unit (1) is provided with a housing (2) which is composed of two parts (2a, 2b). The clamping device (13) and the tool support (9) are supported in the upper housing part (2a). The lower housing part (2b) is of modular design and accommodates at least those components (18) which are relevant for controlling the motor. With a pipe end machining unit (1) designed in such a manner, conversion from an electrical drive to a pneumatic drive, or vice versa, is possible in a simple manner and within a very short time. Furthermore, the essential parts can be standardized, which results in major advantages from the manufacturing point of view.

3 Claims, 2 Drawing Sheets

PIPE END MACHINING UNIT

FIELD OF THE INVENTION

The invention relates to a pipe end machining unit having a housing which surrounds a motor and gear box arrangement, a clamping device for firmly clamping a pipe, and a tool support for a machining tool.

Mobile, preferably portable, pipe end machining units of the type under discussion here are used for metal-cutting machining of pipe ends as a preparatory step for welding or other processing operations. In this case, electrically or pneumatically driven units are used, depending on the prevailing conditions.

It would thus be desirable if the respective unit could be easily and quickly adapted to meet appropriate conditions rather than having to provide a pipe end machining unit for each of the two operational situations.

The object of the invention is thus to improve the pipe end machining unit of the type mentioned in the precharacterizing clause of claim 1, in such a manner that the fundamental design of the unit is the same for both drive versions, and in such a manner that the unit can be changed from one drive to the other with little effort.

SUMMARY OF THE INVENTION

This object is achieved by the features of the present invention wherein the housing (2) is designed in two parts, with the first housing part (2a) being designed to support the clamping device (13) and the tool support (9), and with the second housing part (2b) being of modular design and accommodating at least those components (18; 30) which are relevant for controlling the motor.

By means of a pipe end machining unit having a housing which is designed in two parts, whose first housing part is designed to support the clamping device and the tool support and whose second housing part is of modular design and accommodates at least the components which are relevant for controlling the motor, the unit on the one hand offers advantages from the manufacturing point of view, since the first housing part can be designed in a standard manner for both drive versions, with the majority of the components. On the other hand, this allows conversion from an electrical drive to a pneumatic drive, and vice versa, in a simple manner and within a very short time.

BRIEF DESCRIPTION OF THE DRAWINGS

A preferred exemplary embodiment of the invention will be explained in more detail in the following text with reference to two drawings, in which.

DETAILED DESCRIPTION

Figure 1:
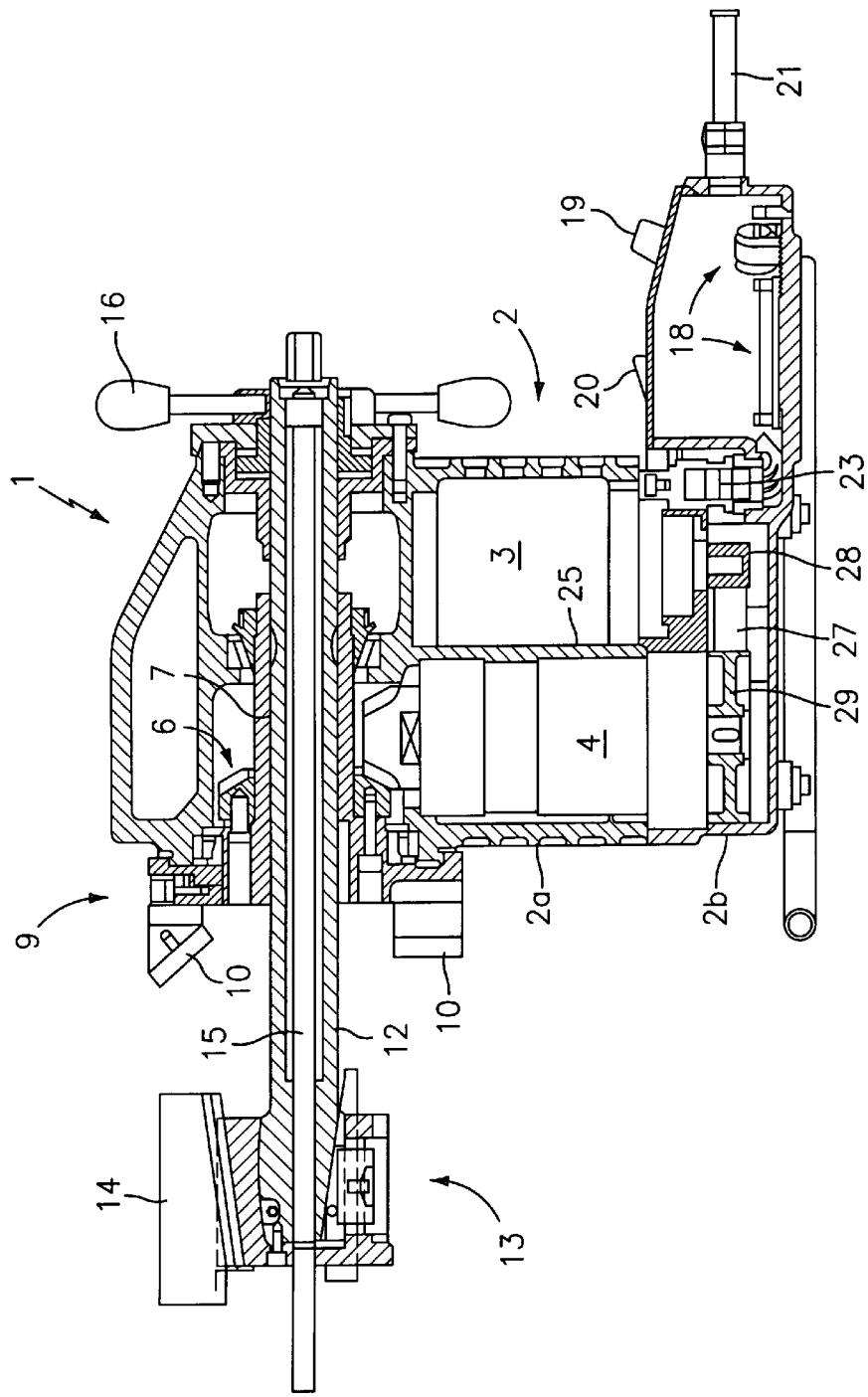
FIG. 1 shows a cross section through an electrically operated pipe end machining unit.

The principles of the design of a pipe end machining unit 1 will be explained in more detail with reference to FIG. 1, which shows an electrically driven version of a pipe end machining unit 1. The pipe end machining unit 1 has a housing 2 in which a motor 3 and a gear box 4 are arranged. The gear box 4 drives the tool support 9 via a bevel gear tooth system 6 and a drive shaft 7, with a plurality of tools 10 being mounted on the tool support 9. A hollow shaft 12 which is supported in the upper part of the housing 2 is provided at the end with a grip 13, by means of which the pipe end machining unit 1 can be fixed on the pipe to be machined (not shown) such that they cannot rotate with respect to one another. A spindle 15 which passes through the hollow shaft 12 and can be operated via a hand lever 16 is provided for radial movement of clamping jaws 14 which are arranged on the grip 13.

The housing 2 itself is designed in two parts, with the first housing part 2a being designed to accommodate the motor 3 and the gear box arrangement 4. The second part 2b of the housing is of modular design and accommodates those components which are relevant for controlling the motor 3. In the case of an electrical drive, the electrical and electronic components 18 are accommodated in this modular housing part 2b, which at the same time acts as a stand for the pipe end machining unit 1. Furthermore, a mains switch 20 is provided, as well as a rotating knob 19 for manually controlling the speed of the motor 3. In order to complete the modular design, the electrical connecting cable 21 is introduced into the lower housing part 2b. A detachable plug connection 23 is provided as the electrical interface between the first and the second housing part 2a, 2b.

The upper housing part 2a is split by a separating wall 25 into two chambers, with the electric motor 3 being accommodated in the right-hand chamber, and the gear box 4 in the left-hand chamber. The electric motor 3 is coupled to the gear box 4 by means of a belt 27, in which case the diameter of the pulley wheel 28 of the electric motor 3 is a fraction of the diameter of the pulley wheel 29 of the gear box 4, so that the belt drive at the same time provides a step-down ratio.

Figure 2:
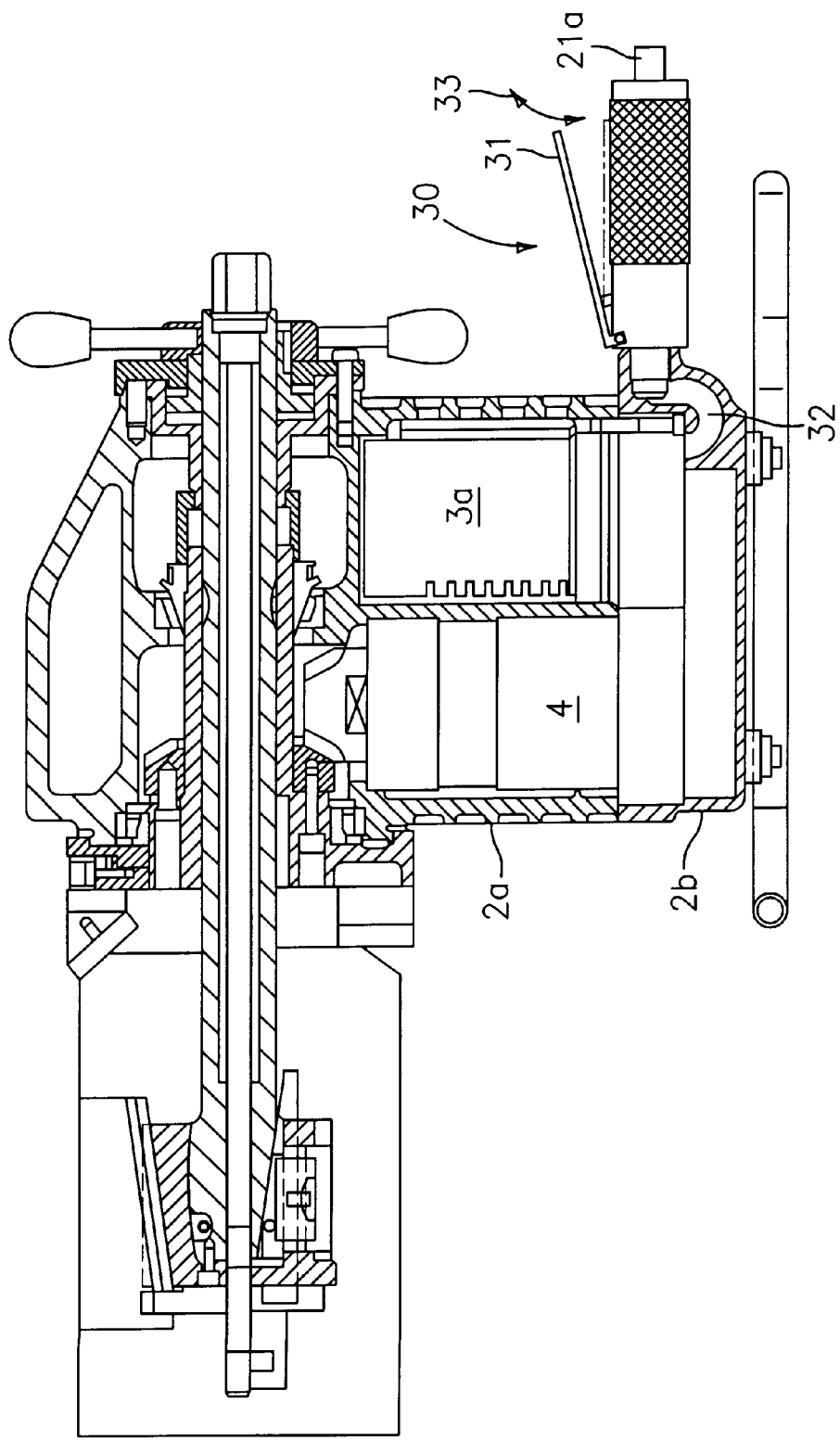
FIG. 2 shows a cross section through a pneumatically operated pipe end machining unit.

In the case of the pneumatic drive illustrated in FIG. 2, a pneumatic restrictor valve 30, which can be operated via a lever 31, is arranged on the housing lower part 2b. In this case, the motor 3a can be both switched on and off and its speed can be controlled via the lever 31. Pushing on the lever 31 causes the restrictor valve 30 to be opened, while this valve is closed again when the lever is released. The speed is controlled by rotating the lever 31 in the direction indicated by arrows 33. With such an embodiment, the motor 3a can be switched on and off, and its speed can be controlled, using one hand. Releasing the lever 31 in this case immediately results in the motor 3a being switched off, to be precise irrespective of the rotation position in which the lever 31 is currently located. This has the advantage that the rotary movement of the tool holder 9 can be stopped within a very short time, for example if there is a threat of danger.

An air channel 32 passes from the restrictor valve 30 through the housing lower part 2b, with a pneumatic interface (not shown) being provided between the first and the second housing part 2a, 2b, via which the pneumatically driven motor 3a is supplied with the necessary compressed air. The compressed air line (not shown) that is required is connected to a plug connection 21a on the rear side of the restrictor valve 30. The parallel arrangement of the motor 3a and of the gear box 4 is identical to that in the electrical version.

In order to convert the pipe end machining unit 1 from pneumatic to electrical drive, or vice versa, all that need be done is to replace the lower housing part 2b as well as the motor 3, 3a and possibly the belt 27, together with the pulley wheel 29 of the gear box 4. The pulley wheel 29 of the gear box 4 needs to be replaced together with the belt 27 if the electric motor 3 is operated at significantly higher speeds than the compressed-air motor 3a.

Another design variant may comprise the motor 3, 3a and, possibly, the gear box 4 as well being arranged on the lower housing part 2*b*. In both cases, a mechanical interface is provided, by means of which the motor 3, 3*a* is coupled to the gear box 4 and the gear box 4 is coupled to power transmission elements (not shown) which are arranged in the first housing part 2*a* and are operatively connected to the tool support 9, when the first housing part 2*a* is mounted on the second housing part 2*b*.

The step-up ratio between the motor 3, 3*a* and the gear box 4 can be varied by replacing the mechanical interface elements—pulley wheels 28, 29 or gear wheels. This is worthwhile in particular if only the motor 3, 3*a* is replaced but not the gear box 4, since the electric motor 3, as already mentioned, is in general operated at higher speeds than the compressed-air motor 3*a*.

Apart from the pulley wheels 28, 29 or gear wheels which have already been mentioned, other elements such as guide elements, fastening elements or snap-action elements may also be provided as mechanical interface elements, to simplify or allow the attachment of the second housing part 2*b* to the first housing part 2*a*, or the replacement of the motor 3, 3*a*.

The modular design of the housing lower part 2*b* means that the major parts of the pipe end machining unit 1 can be standardized, which offers major advantages from the manufacturing point of view. Furthermore, this allows conversion from an electrical drive to a pneumatic drive, and vice versa, in a simple manner and within a very short time. The modular design also improves maintenance convenience.

Furthermore, the parallel arrangement of the motor and gear box results in the advantage that the step-up ratio can be varied by replacing the pulley wheels or the gear wheels.

What is claimed is:

1. A portable device for machining pipe ends having a cutting tool fixed to a drive shaft for machining pipe ends, the drive shaft being driven by a motor and gear box for transferring motion from the motor via the gear box to the drive shaft, and power input means for providing power to the motor, the improvement which comprises:

a modular two part housing comprising a first housing part which surrounds the motor and gear box wherein the motor and gear box are disposed side by side within the first housing part, and a second housing part located below the first housing part which surrounds the power input means to the motor wherein the first housing part and second housing part are selectively detachably connected together to form an interface between the power input means and the motor and wherein the second housing part forms a support base for the device.

2. A device according to claim 1 wherein the power input means is electrical.

3. A device according to claim 1 wherein the power input means is pneumatic.

* * * * *